United States Patent

Bryant

[11] Patent Number: 4,774,135
[45] Date of Patent: Sep. 27, 1988

[54] PROCESS FOR COATING YARN WITH HOT MELT THERMOPLASTIC

[75] Inventor: Michael I. Bryant, Thomasville, N.C.
[73] Assignee: BGF Industries, Inc., Greensboro, N.C.
[21] Appl. No.: 926,728
[22] Filed: Nov. 4, 1986

Related U.S. Application Data

[63] Continuation of Ser. No. 863,725, May 16, 1986.
[51] Int. Cl.⁴ .................... C03C 25/02; D06B 5/18
[52] U.S. Cl. ...................... 428/392; 28/182; 57/258; 57/295; 427/358; 428/378
[58] Field of Search ............ 28/182; 57/258, 295; 427/358; 428/378, 392

[56] References Cited

U.S. PATENT DOCUMENTS

| | | |
|---|---|---|
| Re. 30,770 | 10/1981 | Shobert et al. . |
| T101,401 | 1/1982 | Zion . |
| 267,044 | 11/1882 | Waring .................. 427/358 |
| 1,498,738 | 6/1924 | Lahousse ................ 427/358 |
| 1,747,940 | 2/1930 | Kienle .................... 427/358 |
| 1,857,987 | 5/1932 | Twiss et al. ............. 427/358 |
| 3,466,717 | 9/1969 | Kuroda .................... 28/180 |
| 3,529,050 | 9/1970 | Smith . |
| 3,948,673 | 4/1976 | Chase et al. . |
| 3,954,490 | 5/1976 | Cockram . |
| 3,979,493 | 9/1976 | Cameron et al. . |
| 4,136,069 | 1/1979 | Vachon et al. ........... 524/317 |
| 4,154,634 | 5/1979 | Shobert et al. . |
| 4,173,486 | 11/1979 | Cheetham et al. . |
| 4,224,377 | 9/1980 | Moens . |
| 4,314,853 | 2/1982 | Moens . |
| 4,401,782 | 8/1983 | Conklin et al. .......... 8/115.6 |

FOREIGN PATENT DOCUMENTS

| | | |
|---|---|---|
| 48943 | 4/1974 | Japan . |
| 35090 | 2/1982 | Japan . |

Primary Examiner—James C. Cannon
Attorney, Agent, or Firm—Nixon & Vanderhye P.C.

[57] ABSTRACT

A yarn with a smooth coating is produced by coating a yarn with a thermoplastic material in the melt state, drawing the coated yarn through a heated dye, and cooling the coating.

10 Claims, 1 Drawing Sheet

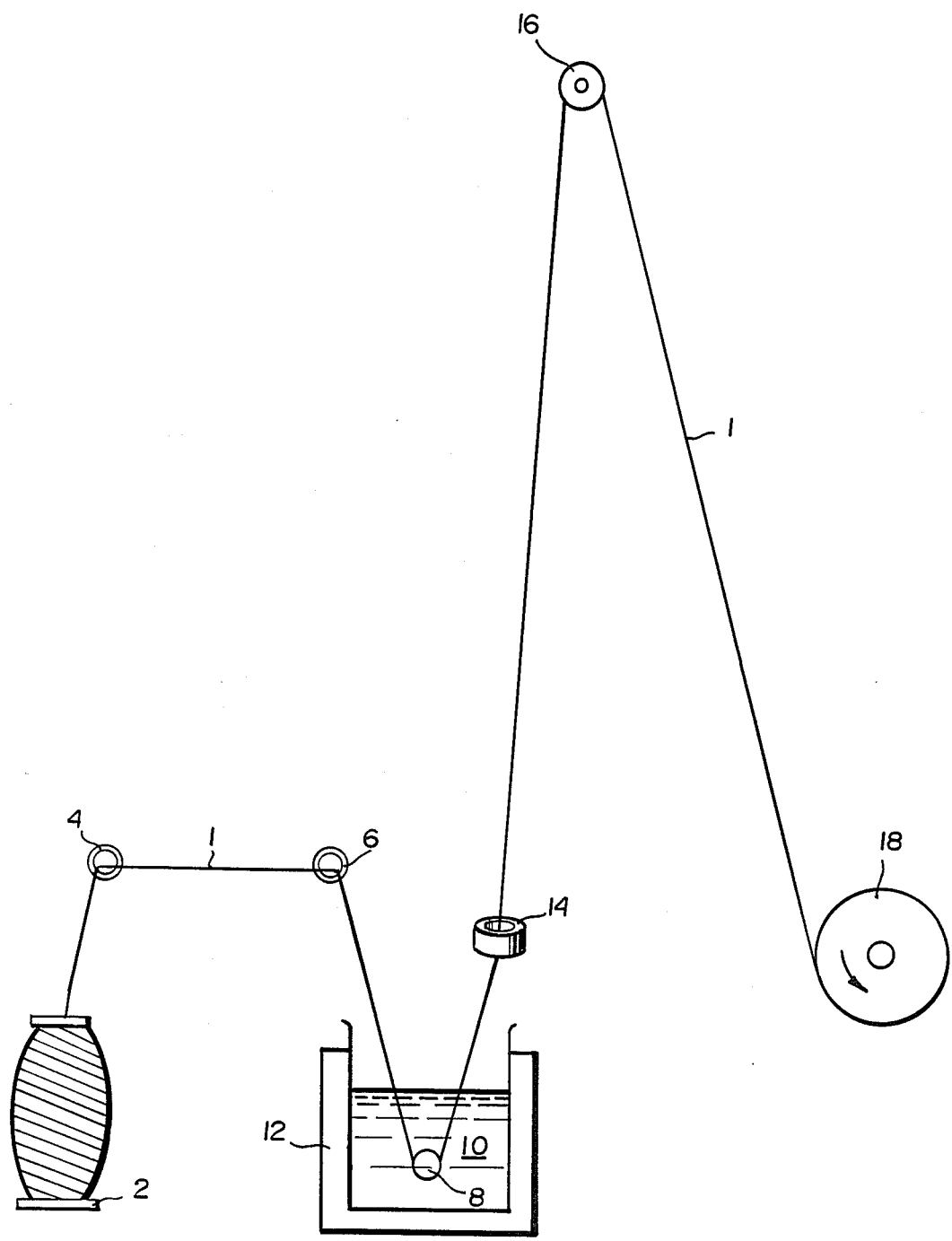

PROCESS FOR COATING YARN WITH HOT MELT THERMOPLASTIC

CROSS-REFERENCE TO RELATED APPLICATIONS

This application is a continuation-in-part of earlier application Ser. No. 863,725 filed May 16, 1986.

BACKGROUND OF THE INVENTION

This invention relates to a method of coating a yarn and, more particularly, to a method of coating a fiberglass yarn with a hot melt thermoplastic composition by applying the thermoplastic as a melt to the yarn from a heated bath, then drawing the thus coated yarn through a heated die to force the hot melt composition into the central areas of the yarn and leave a uniform, smooth coating on the outside of the yarn, and finally cooling the coated yarn at ambient temperatures to allow the melt to return to its solid state.

Glass yarns coated with hot melt compositions have several uses. One use is to bind the edges of a glass fabric woven on a shuttleless loom, as described in copending, commonly assigned application Ser. No. 863,725 filed May 16, 1986, entitled "Bonded Glass Fabric Edge" to prevent the edges from raveling. There are various procedures for applying hot melt compositions to the glass yarn. One procedure is to apply a uniform coating of a hot melt thermoplastic composition to a fiberglass yarn with thorough impregnation of the thermoplastic into the yarn, such as kiss coating the yarn. However, kiss coating has certain disadvantages including low loading and much variation. In the kiss coat method a grooved roll is partially immersed in a bath of a heated hot melt composition, and prior to contact with the yarn, excess melt is wiped from the roll. This is followed by directing a passing yarn into the melt-filled v's of the grooved roll. The product that resulted was uneven with beaded areas along the length of the yarn and often had zones of excessive amounts of melt adhered to certain areas of the yarn. When high levels of coating are to be applied to a yarn, for instance coating levels approximating the weight of the uncoated yarn itself, expressed as 100% pickup, kiss coating with a grooved roll, as described, results in an uneven, beaded coating. In addition to the type of coating procedure employed, variations in temperature, melt viscosity, roll speed, and yarn speed also affected the resin pick up and thus consistency of the coated yarn.

Dies have been used for several years to coat yarns. These die coating procedures apply a liquid coating solution, i.e. an aqueous solution, solvent solution, plastisol, organisol, etc., to the yarn. The yarn is then passed through a coating die of the prescribed orifice size which squeezes the coating into the yarn bundle and doctors off excess coating. The yarn is next passed through an oven to dry by evaporating the solvent and/or curing the coating depending upon the nature of the coating composition applied. The drying procedure requires considerable investment in drying equipment and additional time to fully dry/cure the yarn prior to windup on a reel.

A distinction must be made between the use of liquid polymers or polymer solutions and hot melt coatings. The liquid polymers or solutions of polymers dissolved in a solvent, typically an epoxy resin dissolved in a volatile organic solvent, require the use of heat to drive off the solvent and/or cure the resin that is coated on the yarn. In contrast to the resin solution approach, in which the resin once cured cannot be returned to a mobile state, this invention features the use of hot melts which are applied in the molten state and solidify on cooling. This solidification is reversible and the coating can be made molten once again with heat. This reversibility is an important feature when the hot melt coated yarn is used as a leno edge bonding for woven glass cloth.

BRIEF DESCRIPTION OF THE DRAWINGS

FIG. 1 is a schematic illustration of the equipment and procedures for hot melt coating a yarn using the process of this invention.

The process of the present invention applies a hot melt composition to a yarn and then through a heated die to fully impregnate the yarn with the coating composition and to remove or "doctor off" the excess coating. Coated yarn emerging from the die requires only a few moments at ambient temperature to allow the coating to cool below the melt temperature and solidify. The coated yarn can be directly wound onto a reel or other holder; oven drying and curing are not required.

FIG. 1 further illustrates the process of the invention in which a yarn supply package 2 preferably of fiberglass yarn 1, is provided and conveyed via a series of eyes 4, 6, 8 into a melt of hot melt thermoplastic 10 (as more fully described below) which is maintained in a heated container 12. The yarn 1 is passed directly, generally upward, from the thermoplastic melt 10 into a heated die 14 heated by a resistance element (not shown) or other thermostatically controlled heating means to maintain the die at a predetermined temperature. The opening shown in the die 14 is much larger for purposes of illustration than in the actual die. The orifice of the die 14 is selected to slightly confine the melt-laden yarn, force the melt into the interstices of the yarn and to doctor off any excess thermoplastic leaving a smooth, even coating on yarn 1. The yarn is then directed away from the heated die and exposed to the ambient surrounding air for a period of time sufficient to cool the coating and allow it to return to the solid state—in the particular embodiment a turn-around pulley 16 is used—then the yarn is wound directly onto a winder 18. The distance between die 14 and the turn around pulley 16 is adjustable depending upon the solidification requirements of the hot melt composition. Ovens or other dying devices are not required.

Hot melt coating compositions which may be employed according to the present invention are a specific class of thermoplastic materials which when heated to the required temperatures become slightly viscous and less solid to form a melt. Hot melts are used predominantly with textile materials as an adhesive or as a textile sizing. Typically, such compositions have a melt viscosity less than about 200,000 cps, and preferably less than 100,000 cps, at 300° F. Examples include blends of ethylene/vinyl ester copolymer, petroleum wax and a thermoplastic resin or blends of copolymers of ethylene with acrylic or methacrylic acid. These blends have low melt viscosities, are easily applied to textile yarns and set up rapidly at ambient temperatures to yield nontacky coatings on the fibers and fiber bundles. Hot melt adhesive compositions are described in U.S. Pat. Nos. 4,136,069, 4,401,782, 4,082,883, 4,253,840 and 4,576,665, the disclosures of which are incorporated herein by reference.

The process of the invention is further described with reference to the following non-limiting example in which all parts and percentages are expressed by weight.

EXAMPLE

A fiberglass yarn, known in the industry as D450's 1/0, was coated using the apparatus described in FIG. 1. The orifice in the die was a round hole of 0.008" diameter. The hot melt material was Eastabond A-620, hot melt adhesive available from Eastman Chemical Co. The temperature of both the hot melt bath and heated die were maintained at approximately 325° F.; the speed of the yarn was 150 yards per minute and the span between the heated die and the turn around pulley was about 9 feet.

A smooth, uniformly coated yarn was obtained which had a coating pick-up of approximately 100% (half of the weight of the coated yarn was the hot melt material). The yarn was used in the leno end of an airjet woven fabric and heat set on the loom as described in my copending application Ser. No. 863,725 filed May 16, 1986, the disclosure of which is hereby incorporated by reference. It performed very well at preventing edge ravelling.

The process of this invention has been described, for purposes of illustration, specific to fiberglass yarn. It will be understood that virtually any yarn may be similarly coated provided the temperature of the hot melt does not seriously degrade the yarn. The amount of hot melt composition applied to the yarn is a function, in the first instance, of the size of the die orifice in relation to the yarn size. Once the yarn size and die orifice size are fixed, the amount of pick up is affected only slightly by variations in yarn speed, temperature and viscosity. Hot melt coated glass fibers made according to the process of this invention also may be used as reinforcement fibers for cement compositions and as a reinforcing matrix or filler for polymeric compositions.

The hot melt composition is conveniently maintained at a temperature affording the optimum handling and viscosity properties for the specific composition employed. This temperature, or operational temperature range, will vary depending upon the particular composition employed, but it is usually above 300° F. and may be as high as 400° F., the upper temperature indicated by fumes or severe smoking of the melt or by melt decomposition.

What is claimed is:

1. A process for coating a yarn with a hot melt composition comprising the steps of:
   (a) contacting a textile yarn with a melt of a heated hot melt composition to thoroughly coat the yarn;
   (b) passing the thus coated yarn through the opening of a heated die thereby compressing the melt coated on the yarn and forcing the melt into the interstices of the yarn while leaving the yarn with a smooth, uniform, melt-coated outer surface; and immediately thereafter
   (c) exposing the yarn of step (b) to ambient air and allowing the thus applied melt to return to a solid non-tacky state as a uniform film on the outside surface of the yarn.

2. The process of claim 1 including the additional step of (d) taking up the non-tacky coated yarn on a reel.

3. The process of claim 1 in which a mineral fiber yarn is coated.

4. The process of claim 3 in which a glass fiber yarn is coated.

5. The process of claim 1 in which the melt is retained in a heated bath and the yarn is immersed in and drawn through the bath.

6. The process of claim 5 in which the heated die is positioned substantially directly above the heated bath and any excess hot melt composition is returned by gravity to the heated bath.

7. The process of claim 5 in which the operational temperature of the heated die is ±10° F. of the temperature of the heated bath.

8. The process of claim 5 in which the melt is maintained at a temperature in the range of about 300° F. to about 400° F.

9. A glass fiber coated yarn having a substantially uniform film of a hot melt composition on the outside surface and thoroughly impregnated into the interstices of the yarn produced by the process of claim 4.

10. The glass fiber coated yarn of claim 9, in which the hot melt composition is about one-half the weight of the coated yarn.

* * * * *